US010401590B2

(12) United States Patent
Wan et al.

(10) Patent No.: US 10,401,590 B2
(45) Date of Patent: Sep. 3, 2019

(54) EMBEDDABLE CAMERA WITH LENS ACTUATOR

(71) Applicant: Google LLC, Mountain View, CA (US)

(72) Inventors: Chung Chun Wan, Mountain View, CA (US); Jamyuen Ko, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/806,188

(22) Filed: Nov. 7, 2017

(65) Prior Publication Data

US 2019/0137728 A1    May 9, 2019

(51) Int. Cl.

| G02B 7/09 | (2006.01) |
|---|---|
| G02B 7/10 | (2006.01) |
| H04N 5/225 | (2006.01) |
| H04N 5/232 | (2006.01) |
| G06F 1/16 | (2006.01) |
| H01F 7/02 | (2006.01) |

(Continued)

(52) U.S. Cl.
CPC .............. *G02B 7/09* (2013.01); *G02B 7/08* (2013.01); *G02B 7/10* (2013.01); *G03B 3/10* (2013.01); *G06F 1/1686* (2013.01); *H01F 7/02* (2013.01); *H01F 7/064* (2013.01); *H04N 5/2252* (2013.01); *H04N 5/2253* (2013.01); *H04N 5/2257* (2013.01); *H04N 5/23212* (2013.01); *H04N 5/23293* (2013.01); *G03B 2205/0069* (2013.01); *H04M 1/0264* (2013.01)

(58) Field of Classification Search
CPC ............... H04N 5/2257; H04N 5/2252; H04N 5/23212; H04N 5/23293; G02B 7/09; G02B 7/10

See application file for complete search history.

(56) References Cited

U.S. PATENT DOCUMENTS

| 9,681,031 B2 | 6/2017 | Brodie et al. |
|---|---|---|
| 2007/0047942 A1 | 3/2007 | Chang et al. |

(Continued)

FOREIGN PATENT DOCUMENTS

| JP | 2017-009998 | 1/2017 |
|---|---|---|
| WO | WO2014188656 | 11/2014 |

OTHER PUBLICATIONS

PCT International Search Report and Written Opinion issued in International Application No. PCT/US2018/045953, dated Oct. 23, 2018, 13 pages.

*Primary Examiner* — Abdelaaziz Tissire
(74) *Attorney, Agent, or Firm* — Fish & Richardson P.C.

(57) ABSTRACT

Implementations of the subject matter described herein include an actuator for adjusting focus in a camera. The actuator can include a carrier module that slides within a central opening of a housing and that carries a lens assembly of the camera. A magnet is located on a first lateral side of the carrier module. A wire coil is located on or along a first lateral side of the housing and faces the magnet on the first lateral side of the carrier module. A driver circuit is located on or along a second lateral side of the housing opposite the first lateral side of the housing. A connector component extends from a first region proximate the first lateral side of the housing to a second region proximate the second lateral side of the housing, the connector component including a conductor that electrically couples the driver circuit to the wire coil.

18 Claims, 9 Drawing Sheets

(51) Int. Cl.
  *H01F 7/06* (2006.01)
  *G02B 7/08* (2006.01)
  *G03B 3/10* (2006.01)
  *H04M 1/02* (2006.01)

(56) References Cited

U.S. PATENT DOCUMENTS

| | | |
|---|---|---|
| 2012/0020654 A1 | 1/2012 | Yanagisawa et al. |
| 2016/0134813 A1* | 5/2016 | Hu ..................... H04N 5/2254 348/208.11 |
| 2016/0154204 A1* | 6/2016 | Lim ..................... G02B 7/08 359/557 |
| 2016/0246029 A1 | 8/2016 | Kim et al. |
| 2016/0299349 A1 | 10/2016 | Cho |
| 2017/0108705 A1* | 4/2017 | Yu ..................... G02B 7/09 |

* cited by examiner

EMBEDDABLE CAMERA WITH LENS ACTUATOR

TECHNICAL FIELD

This disclosure relates to cameras, and more particularly to techniques for actuating a lens assembly in a camera module.

BACKGROUND

Consumer electronic devices such as smartphones, tablets, and notebook computers commonly include one or more embedded cameras that allow users to capture digital images, video, or both. A smartphone, for example, can be equipped with a pair of cameras including a rear-facing camera for capturing scenes to the rear of the phone and a front-facing camera for capturing scenes in front of the phone. A user can access a camera application on the phone to activate one of the cameras, view a real-time display of the image sensed by the camera (e.g., a virtual viewfinder), and select a control to capture and store an image or video. The rear-facing camera is sometimes used as a "point and shoot" camera to capture images of scenes in front of the user, while the front-facing camera is often used to take pictures or video of the user who is holding the device in which the camera is embedded, e.g., for "selfies" or live video conferencing. Some devices locate the front-facing camera module within a bezel that surrounds a primary display assembly of the device, such as a bezel surrounding a touchscreen of a smartphone.

SUMMARY

This specification discloses systems, methods, devices, and other techniques for actuating a lens assembly in a camera, thereby providing the camera with an auto-focus capability. In some implementations, the camera is a miniaturized camera module that is configured to be embedded within an electronic device or display assembly such as a smartphone, tablet, or flat-screen computer monitor. The camera module can include a voice coil motor that is operable to actuate a lens assembly and cause the lens assembly to slide within a housing of the camera module. As one or more lenses of the lens assembly are moved toward or away from an image sensor of the camera, the image projected onto the image sensor is adjusted so that the camera can focus on objects at different distances in front of the camera. The voice coil motor can include a wire coil that, when energized by an electric current, generates a magnetic field that interacts with a magnetic field of a separate magnet that is fixed to the lens assembly to attract or repel the magnet (and by extension the lens assembly) toward or away from the wire coil.

To reduce the size and profile of the camera module, a driver integrated circuit ("IC") that drives the wire coil can be provided on an opposite side of the camera from the wire coil itself. A connector component, such as a rigid-flex board, can extend from one side of the camera to the other so as to electrically couple the driver IC to the wire coil. As such, despite physical separation between the driver IC and the wire coil on opposite sides of the camera, the driver IC can still energize the wire coil as appropriate to control a distance between the lens assembly and the image sensor. In some implementations, separation of the driver IC from the wire coil reduces a lateral dimension (e.g., a length or width) of the camera module so that the camera occupies a smaller surface area when embedded in an electronic device or display assembly.

Some implementations of the subject matter disclosed herein include an actuator for adjusting focus in a camera. The actuator can include a housing, a carrier module, a magnet, a wire coil, a driver circuit, and a connector component. The housing can slidably receive the carrier module within a central opening of the housing. A lens assembly can be secured within and carried by the carrier module. The magnet can be located on a first lateral side of the carrier module. The wire coil can be located on a first lateral side of the housing and arranged to face the magnet on the first lateral side of the carrier module (e.g., adjacent to the magnet). The driver circuit can be located on or along a second lateral side of the housing opposite the first lateral side of the housing. The connector component can extend from a first region that is proximate to the first lateral side of the housing to a second region that is proximate to the second lateral side of the housing. The connector component can include at least one conductor configured to deliver an electrical current from the driver circuit to the wire coil to energize the wire coil.

These and other implementations can optionally include one or more of the following features, in any combination.

The magnet that is located on the first lateral side of the carrier module can be configured to generate a first magnetic field. The wire coil, when energized, can be configured to generate a second magnetic field. The carrier can be configured to slide within the central opening of the housing to a position that results from interaction of the first magnetic field generated by the magnet and the second magnetic field generated by the energized wire coil.

The magnet that is located on the first lateral side of the carrier module can be or include a permanent magnet.

The connector component can include a rigid-flex printed circuit board, and the at least one conductor of the connector component can include at least one conductive trace disposed on or within the rigid-flex printed circuit board.

The driver circuit can include a driver integrated circuit that is configured to receive, from a controller, a control signal that indicates an activation state to apply to the wire coil, and the driver integrated circuit can be configured to deliver the electrical current to the wire coil to energize the wire coil according to the activation state indicated by the control signal.

The actuator can be configured to embed in a computing device or in an electronic display assembly in an orientation in which the first and second lateral sides of the housing run vertically along respective axes that extend between a top of the computing device or electronic display assembly and a bottom of the computing device or electronic display assembly.

The actuator can further include a position sensor located on or along the second lateral side of the housing. The position sensor can be configured to sense a current position of the carrier module from a range of possible positions that the carrier module is capable of sliding to within the central opening of the housing.

The position sensor can include a hall-effect sensor located on or along the second lateral side of the housing. The actuator can further include a second magnet located on a second lateral side of the carrier module opposite the first lateral side of the carrier module, the second magnet being adjacent to the hall-effect sensor to permit the hall-effect sensor to sense motion of the second magnet that results when the carrier module slides within the central opening of the housing.

The actuator can further include one or more stacks of roller balls arranged to facilitate a linear sliding motion of the carrier module within the central opening of the housing.

The wire coil can be mounted on a first printed circuit board that is located along the first lateral side of the housing.

The driver circuit can be mounted on a second printed circuit board that is located along the second lateral side of the housing.

The connector component can extend from the first printed circuit board on which the wire coil is mounted to the second printed circuit board on which the driver circuit is mounted.

Some implementations of the subject matter disclosed herein include a camera. The camera can include any of the actuators described herein, a lens assembly secured at least partially within the carrier module of the actuator, and an image sensor. The image sensor can be located at a fixed position relative to the housing of the actuator, wherein one or more lenses of the lens assembly are configured to direct external light through an aperture and to a surface of the image sensor. The camera can be configured to adjust focus by moving the carrier module and the lens assembly along an optical axis that extends through the one or more lenses and the image sensor when the electrical current delivered from the driver circuit to the wire coil is adjusted.

Some implementations of the subject matter disclosed herein include a computing device. The computing device can include an electronic display, a camera as described herein, one or more computer processors, and one or more computer readable media. The computer-readable media can have instructions stored thereon that, when executed by the one or more processors, are configured to provide a camera application that uses the camera to capture digital images in an environment of the camera and to provide the images for display on the electronic display.

These and other implementations can optionally include one or more of the following features.

The computing device can be a smartphone, a tablet computing device, or a notebook computer.

The computing device can be a smartphone that includes the electronic display on a front side of the smartphone. The camera can be embedded in the smartphone as a front-facing camera on the front side of the smartphone.

Some implementations of the subject matter disclosed herein include a method for actuating a lens assembly in a camera. The method can include receiving, by a driver circuit and from a controller, a control signal that causes the driver circuit to energize a voice coil motor of the camera. The voice coil motor can include a permanent magnet and an electromagnet having a wire coil, the permanent magnet located on a first lateral side of a carrier module that holds the lens assembly, the wire coil located on or along a first lateral side of a housing that slidably receives the carrier module, the first lateral side of the carrier module located adjacent to the first lateral side of the housing such that the permanent magnet and the wire coil are located adjacent to each other, the driver circuit electrically coupled to the wire coil and located on or along a second lateral side of the housing opposite the first lateral side of the housing. In response to receiving the first signal that is to cause the driver circuit to energize the voice coil motor of the camera, delivering an electrical current from the driver circuit to the wire coil to generate a first magnetic field around the wire coil that interacts with a second magnetic field of the permanent magnet. As a result of delivering the electrical current from the driver circuit and through the wire coil to generate the first magnetic field that interacts with the second magnetic field of the permanent magnet, the method can include actuating the lens assembly in the camera including sliding the carrier module within the housing by a positive distance along an optical axis of the camera.

These and other implementations can optionally include one or more of the following features.

The method can further include detecting a current position of the carrier module within the housing using a position sensor located on or along a lateral side of the housing; and determining whether to energize the voice coil motor of the camera based on the current position of the carrier module within the housing and a focus objective for the camera.

The camera can be embedded in a smartphone, a tablet computing device, or a display assembly of a notebook computer.

Actuating the lens assembly can be performed by sliding the carrier module within the housing by the positive distance along the optical axis of the camera, thereby imparting motion on one or more lenses of the lens assembly toward or away from an image sensor of the camera to adjust the focus of the camera.

The subject matter of the present disclosure, in some implementations and in certain instances, achieve one or more of the following advantages. First, by providing a voice coil motor in an embeddable camera module, a lens assembly can be moved linearly along an optical axis of the camera to adjust the distance between the lens assembly and an image sensor. As the distance between the lens assembly and the image sensor is varied, the camera can automatically focus on objects located at different distances within a field of view of the camera. Second, by providing the driver circuit (IC) and wire coil on different (e.g., opposite) sides of the camera module, a lateral dimension (e.g., a length or width) of the camera module can be reduced. For example, rather than co-locating the driver IC and the wire coil on a single printed circuit board on one side of the camera module, the driver IC and the wire coil can instead be disposed on separate boards on opposite lateral sides of the camera. This arrangement can reduce or prevent protrusion of the driver IC and/or wire coil beyond the lateral sides of the housing, carrier assembly, and/or lens assembly so that an overall lateral dimension of the camera module is not increased by the driver IC and wire coil. Individually, for instance, the driver IC and wire coil may be narrower than the barrel of the carrier assembly that holds the lenses, but when arranged adjacent to each other on a single printed circuit board, the driver IC and wire coil would be wider than the barrel, thereby increasing the overall lateral dimension of the camera module. The techniques disclosed herein can be applied to separate the driver IC and wire coil so as to reduce a lateral dimension of the camera.

In some implementations, the reduced size of the camera module that results from these techniques allow the camera to occupy less space when embedded in an electronic device or display assembly. For example, a trend in smartphone design has been to extend the touchscreen display on the front of the phone increasingly closer to the physical edges of the device while minimizing or eliminating the bezel surrounding the display. A camera module having a reduced lateral dimension along a vertical axis (i.e., an axis that runs from the top to the bottom of the phone) according to the techniques disclosed herein can permit reduction in the size of the bezel in which the camera is embedded. In turn, the reduced bezel size can facilitate increase in the display area to phone size ratio according to desired design objectives.

The details of one or more embodiments are set forth in the drawings and the detailed description below. Additional features and advantages will be apparent to those of ordinary skill in the field to which the invention pertains.

DETAILED DESCRIPTION

This disclosure generally describes an actuator for a camera assembly (also referred to as a "camera module") that provides an auto-focusing capability. In some implementations, the camera assembly is configured to embed in an electronic device or a display assembly, such as in a smartphone, a tablet computer, a television, or a computer monitor. The camera assembly can be mounted adjacent a top edge of a display screen, for example, in a bezel that forms a perimeter of the screen. Because a minimal width of the bezel (e.g., to provide an aesthetically pleasing device and to minimize overall device size while maximizing the display area) can be limited in part by the size of the camera assembly, the camera assembly and actuator disclosed herein can be arranged so as to reduce a lateral dimension of the camera assembly, and to generally increase its compactness. As described in further detail with respect to the figures, the size of the actuator, and the camera assembly as a whole, can be reduced by mounting (i) a wire coil that is part of a voice coil motor of the actuator and (ii) a driver IC that drives the wire coil to generate a magnetic field, on opposite sides of the assembly rather than adjacent to each other on a same side of the assembly.

Figure 1:
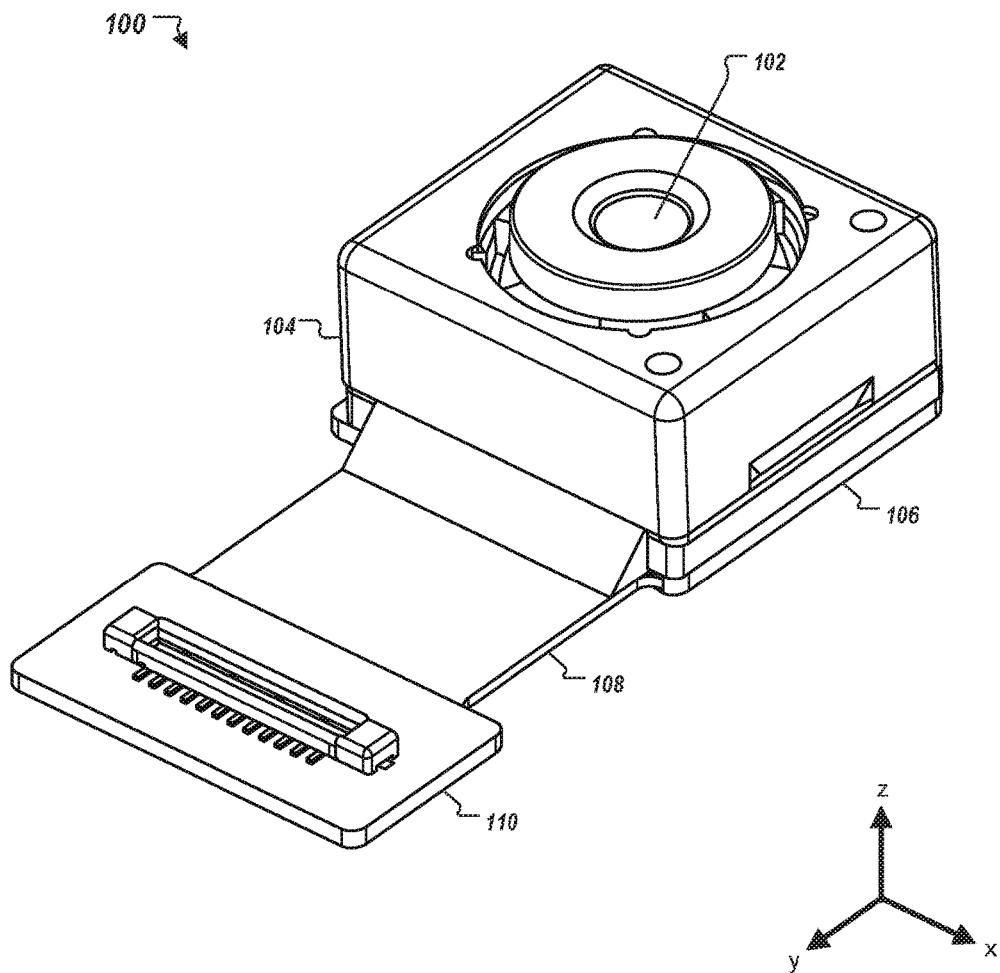
FIG. 1 depicts a perspective view of an assembled camera.

Turning to FIG. 1, a perspective view of an assembled camera module 100 is shown. The camera module 100 can be sized to embed in an electronic device or a display assembly, such as in a smartphone, a tablet computer, a television, or a computer monitor. In some implementations, the camera module 100 is a front-facing camera module, such as a camera that is mounted on the front of a smartphone and especially adapted for capturing front-facing images of the phone's user, enabling live video conferencing, or facilitating other activities that rely on images from a front-facing field of view. As described with respect to FIGS. 3A-3H and 4, the camera module 100 can include an actuator that moves a lens assembly relative to an image sensor to provide an auto-focusing capability.

The camera module 100 can include components for capturing digital images and video, and components for interfacing with a microprocessor or other controller or data processing apparatus in a device in which the camera module 100 is embedded. For example, as shown in FIG. 1, the camera module 100 can include an aperture 102, a body 104, a base 106, a ribbon 108, and a connector 110. The aperture 102 collects light emanating external to the camera through an opening at the center of the camera module 100. The light that enters the aperture 102 is directed through one or more lenses of a lens assembly (not shown in FIG. 1) and projected onto an image sensor (not shown in FIG. 1). The image sensor can be mounted to the base 106, which, e.g., can be a printed circuit board. In some implementations, the image sensor is a charge-coupled device (CCD). In other implementations, the image sensor is a complementary metal-oxide semiconductor (CMOS) sensor. Images projected on the image sensor can be captured, stored, and/or presented to a user, for example.

The body 104 of the camera module 100 includes a collection of structural components that facilitate operation of the camera 100. For instance, the body 104 can include an actuator (described further with respect to FIGS. 3A-3H) and a cover that encloses the actuator and other camera components. The ribbon 108 can be a flexible substrate including a series of electrical traces that run between pins of the electrical connector 100 and electronic components within the camera module 100. The pins on electrical connector 100 can be mated, in use, with pins on a complementary electrical connector 100 to deliver power to the camera module 100, transmit and receive control signals between the camera module 100 and data processing apparatus of the device in which the camera module 100 is embedded, and to transfer digital image data that was captured by the image sensor for external processing.

Figure 2:
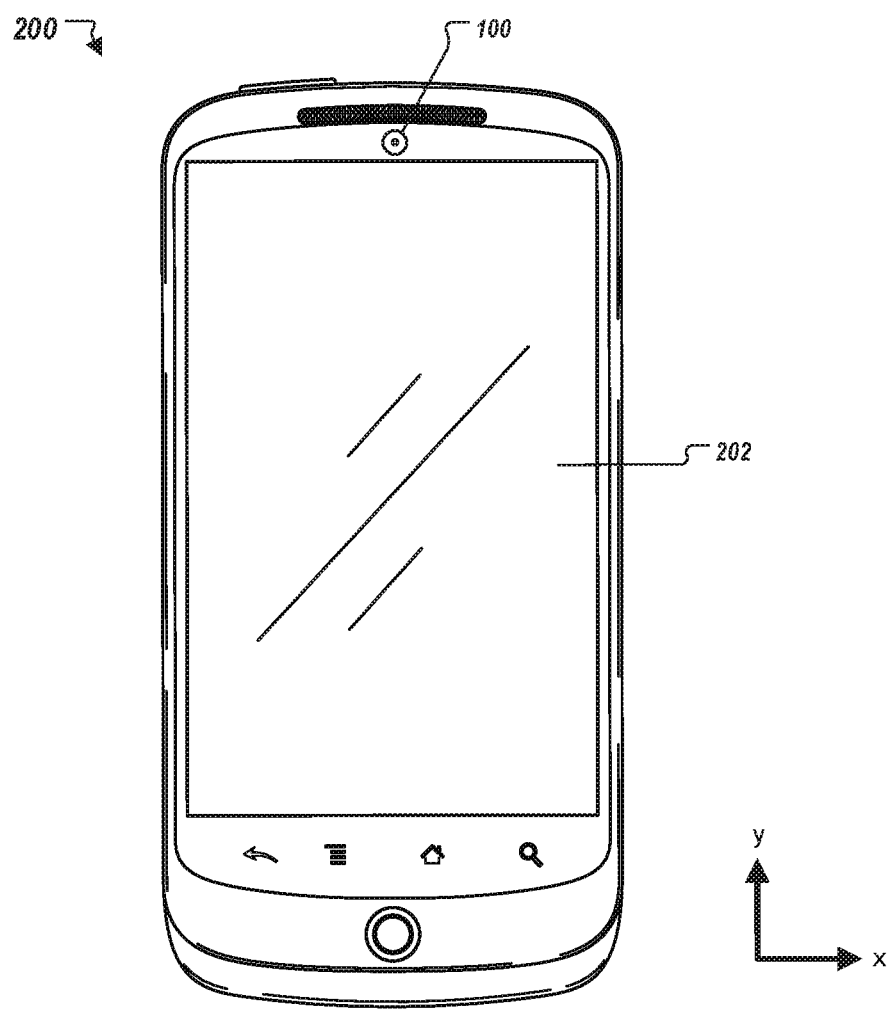
FIG. 2 depicts a front view of an example smartphone having an embedded camera above a touchscreen display.

FIG. 2 is a diagram of an example smartphone device 200 that includes a front-facing camera module 100. As this figure illustrates, the device 200 includes a primary touchscreen 202 (e.g., an LCD or OLED touchscreen display) that occupies a substantial portion of the front-side of the device 200. In some smartphones, the surface area of the touchscreen display consumes greater than ninety-percent of the entire surface area on the front side of the device. The camera module 100 is located above the touchscreen 202 in a bezel between the top edge of the touchscreen and a top edge of the device 200. In some implementations, the device 200 can be designed so as to minimize the amount of space between the top edge of the touchscreen 202 and the top edge of the device 200. This can be achieved in part by re-locating the speaker above the camera module 100, extending the touchscreen 202 even further toward the top edge of the device 200, and reducing/minimizing the vertical dimension (i.e., the lateral dimension that runs along the y-axis in FIG. 2) of the camera module 100 that is disposed between the top edge of the touchscreen 202 and the top edge of the device 200.

FIGS. 3A-3H illustrate perspective view of components of an actuator 300 for a camera assembly. In some implementations, the actuator 300 can be implemented in camera module 100 (FIG. 1) and can form part of the body 104 of the camera module 100.

Figure 3A:
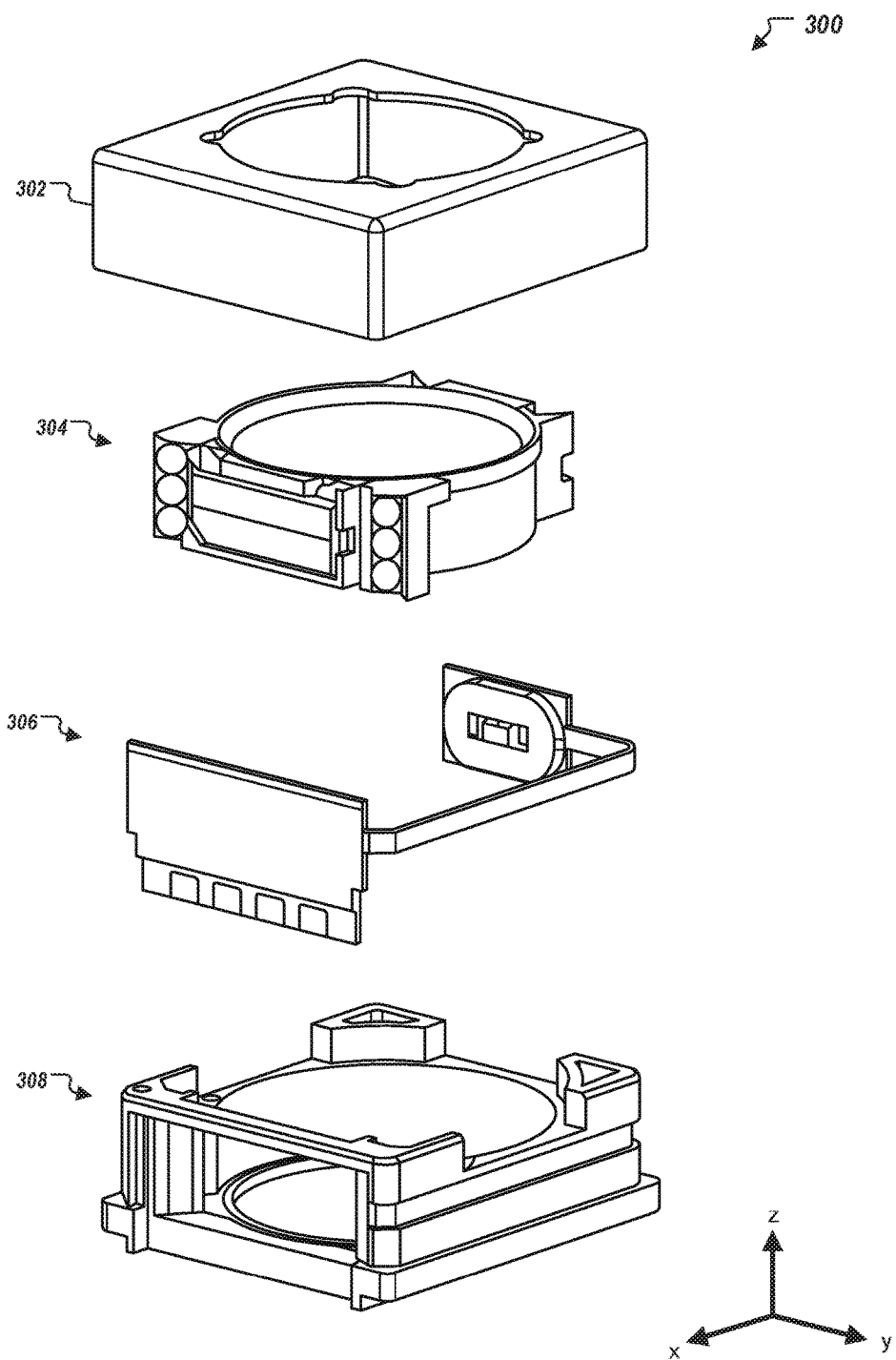
FIGS. 3A-3B show exploded views from two angles of an actuator for a camera assembly.
Figure 3B:
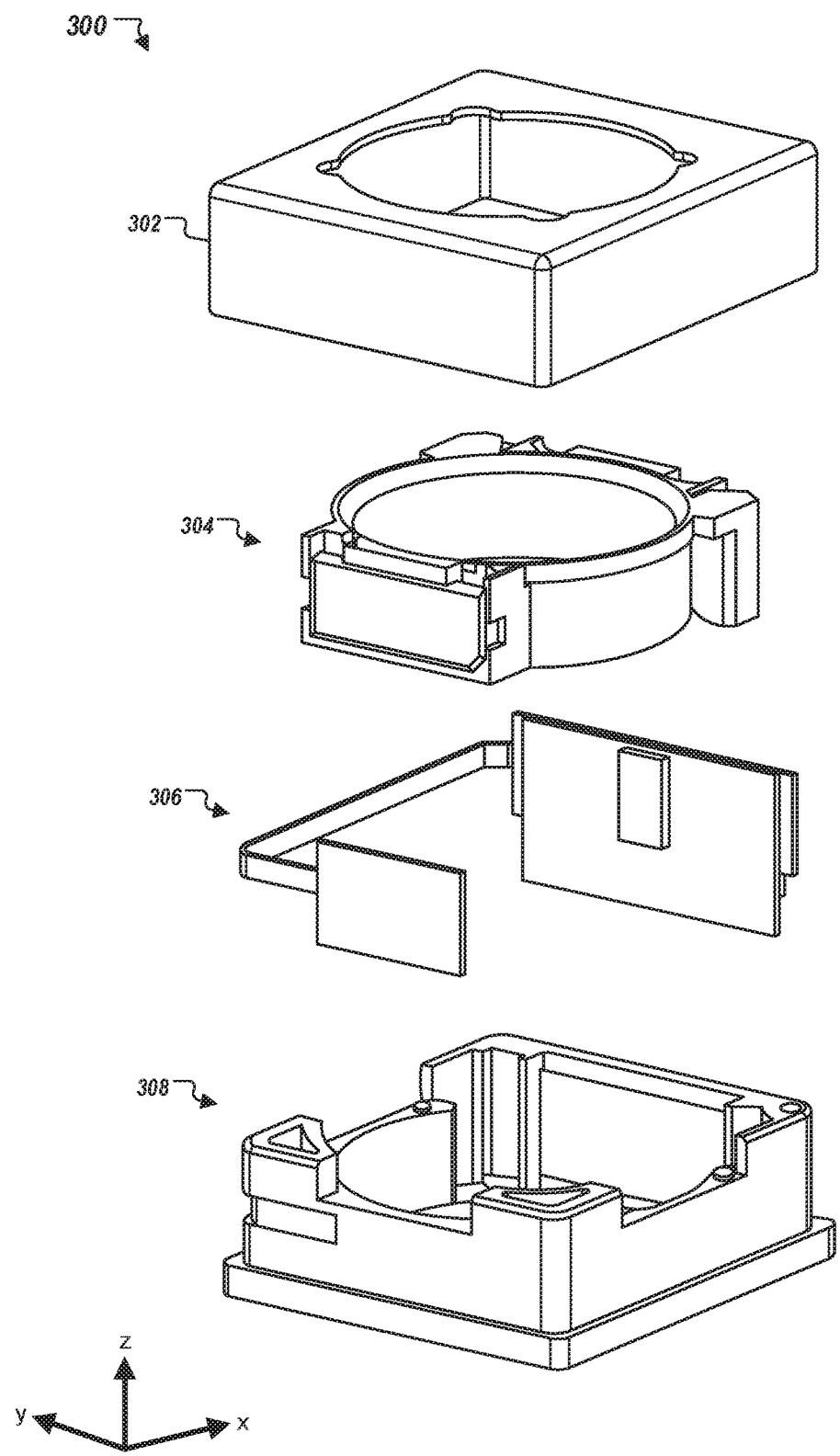

In more detail, FIGS. 3A-3B show exploded views of major components 302-308 of the actuator 300. These components include a top cover 302, a carrier module 304, a connector assembly 306, and a housing 308. Generally, the housing 308 provides a frame that supports the carrier module 304 within a central opening/channel of the housing 308. The carrier module 304 is received within the central opening of the housing 308, and is fixed laterally (along the x- and y-axes) in the housing 308 when assembled. However, the carrier module 304 can be capable of sliding within the central opening of the housing 308 in the vertical direction (along the z-axis (also referred to as the "optical axis")) to enable auto-focusing. For example, one or more lenses can be secured within a central opening of the carrier module 304. As the carrier module 304 slides vertically relative to the housing 308, the distance between the lenses in the carrier module and an image sensor located near the base of the housing 308 is changed, thereby adjusting the focus of the camera.

Further to enable an auto-focusing capability of the camera, the actuator 300 can include a voice coil motor that drives movement of the carrier module 304 along the optical axis of the camera, including sliding the carrier module 304 by a distance within the central opening of the housing 308. The voice coil motor can include a first permanent magnet 318 and a wire coil 326. The first permanent magnet 318 is disposed on a first lateral side of the carrier module 304 (i.e., a side of the carrier module 304 located on a first lateral side of the actuator 300 when assembled), while the wire coil 326 is located on or along a first lateral side of the housing 308 (i.e., the side of the housing 308 located on the first lateral side of the actuator 300 when assembled), so that the first permanent magnet 318 and wire coil 326 face each other in the assembly. As a result of the close proximity between the first permanent magnet 318 and the wire coil 326, the wire coil 326 can be energized with an electrical current to generate a magnetic field that interacts with the magnetic field of the first permanent magnet 318. The attractive or repellant forces between the magnetic fields drive the carrier module 304 up or down (along the optical axis) within the housing 308.

A driver circuit, such as driver IC 328, delivers power to the wire coil 326 to energize the coil and generate the second magnetic field that interacts with the magnetic field of the first permanent magnet 318. The driver IC 328 is located on or along a second lateral side of the housing 308 (i.e., a side of the housing 308 located on a second lateral side of the actuator 300 when assembled, the second lateral side of the actuator being opposite the first lateral side of the actuator). The driver IC 328 can energize the wire coil 326 in response to a control signal provided to the driver IC 328 from an external controller, e.g., a microprocessor or other data processing apparatus. In some implementations, the driver IC 328 can adjust the magnetic field emanating from the wire coil 326 to drive the carrier module 304 up or down to precise positions, such as by reversing the direction of the electrical current delivered to wire coil 326 (thereby reversing the polarity of the magnetic field emanated from the wire coil 326) and adjusting the effective strength of the magnetic field (e.g., using pulse width modulation) to adjust the amount of attractive or repellant force between the magnetic fields of first permanent magnet 318 and wire coil 326.

In some implementations, as shown in FIGS. 3A-3H, the wire coil 326 and the driver IC 328 are mounted on opposite ends of a connector assembly 306. The connector assembly 306 includes a pair of substrates 320, 322 (e.g., flexible printed circuit boards) on either end of the assembly on which the wire coil 326 and driver IC 328 are disposed, respectively. A connecting component 324, such as a rigid-flex board, extends between and connects the two substrates 320, 322. The connecting component 324 includes electrical conductors, such as copper traces, that extend between the wire coil 326 and driver IC 328 to electrically couple the wire coil 326 and driver IC 328 to each other. As such, despite the physical separation between the driver IC 328 and wire coil 326 on opposite lateral sides of the actuator 300, the driver IC 328 can still energize the wire coil 326 without being adjacent to the wire coil 326 on a same side of the actuator 300. When the actuator 300 is assembled, the connector assembly 306 wraps around the periphery of housing 308 so that the first substrate 322 and wire coil 326 are located on the first lateral side of the actuator 300, and the second substrate 320 and the driver IC 328 are located on the second lateral side of the actuator 300 opposite the first side. Fasteners, glue, slots and grooves, or other means can secure the substrates 320, 222 of the connector assembly 306 to the housing 308. The connecting component 324 can fit within a horizontal channel 332 molded along a side of the housing 308.

In addition to carrier module 304, connector assembly 306, and housing 308, the actuator 300 can further include a top cover 302. The top cover 302 is configured to fit over the assembly of components 304, 306, and 308. The top cover 302 has sidewalls configured to extend around the periphery of housing 308 and a top piece with a central opening to permit collection of external light through the aperture of the camera. The top cover 302 can serve several purposes. In a first example, the top cover 302 forms a physical barrier that protects the internal components of the actuator 300 (and the camera assembly more broadly) from external forces and hazards. Additionally, in some implementations, the top cover 302 is formed at least partially from a metallic material and serves to shield the camera from electromagnetic interference (EMI) that can occur in the environment of the camera.

Figure 3C:
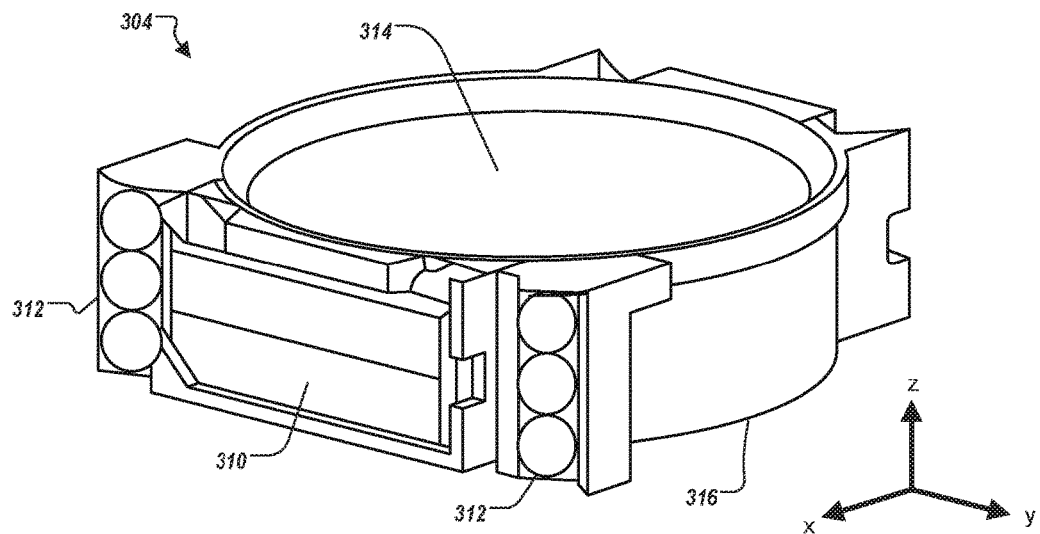
FIGS. 3C-3D are perspective views of a carrier module of the actuator.
Figure 3D:
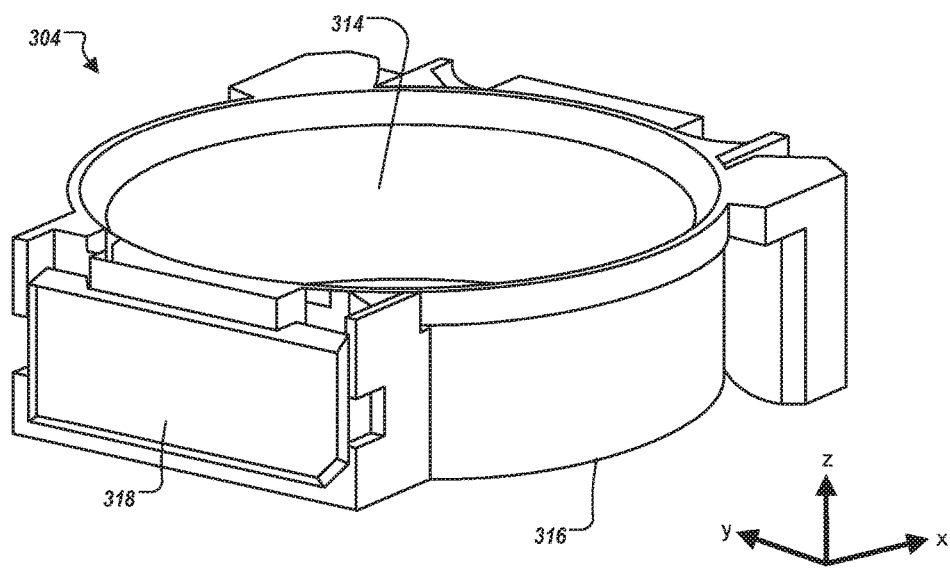

FIGS. 3C and 3D show close-up perspective views of the carrier module 304. The carrier module 304 includes a central opening 314 formed within a circumferential surface 316. The central opening 314 can be sized and shaped to receive a lens assembly of the camera (not shown). The lens assembly can be fixed within the central opening 314 so that, as the carrier module 304 moves along the optical axis of the camera relative to housing 308, the lens assembly is also caused to move along with the carrier module 304.

The carrier module 304 includes two stacks of rollerballs 312 to facilitate slidable movement of the carrier module 304 within the housing 308. For example, the stacks of rollerballs 312 can protrude beyond a plane defined by a casing in which the stacks are partially enclosed. When the carrier module 304 is inserted within the housing 308, the protruding surfaces of the rollerballs 312 can contact an interior surface of the housing 308 (e.g., in channels 334) so as to prevent lateral movement of the carrier module 304 within the housing 308, while facilitating slidability of the carrier module 304 in the vertical direction (i.e., along the optical axis of the camera).

In some implementations, a pair of magnets 310, 318 are disposed on opposite sides of the carrier module 304. The magnets 310, 318 are preferably permanent magnets (e.g., ceramic, ferrite, neodymium iron boron, samarium cobalt, or alnico), but in other implementations either or both magnets can be electromagnets that require an electrical current to energize a magnetic field. The first magnet 318 is located on the first lateral side of the carrier module 304, which when assembled corresponds to the first lateral side of the actuator 300 in use. This magnet 318 is part of the voice coil motor of the actuator 300, as the magnetic field it emanates is harnessed in part to physically drive the carrier module 304 up and down within the housing 308. In particular, in the actuator 300 as assembled, the first magnet 318 is co-located adjacent to the wire coil 326 to allow interaction of the respective magnetic fields emanated by the first magnet 318 and the wire coil 326 when the wire coil 326 is energized.

The second magnet 310, in contrast, does not physically drive the carrier module 304, but is instead used for sensing purposes, such as for tracking a position of the carrier module 304 (and by extension the lens assembly) within housing 308. The second magnet 310 can be located on the second lateral side of the carrier module 304, which when assembled corresponds to the second lateral side of the actuator 300 in use. The second magnet 310 is thus arranged in the assembled actuator 300 adjacent to the second substrate 320. In some implementations, the second substrate 320 includes, in addition to the driver IC 328, a position sensor that is configured to generate a signal indicative of the position of the carrier module 304 within the housing 308. For example, the position sensor can detect when the carrier module 304 is at the top, bottom, or an intermediate position in its range of possible motion within the housing 308. The position sensor can be mounted adjacent to the driver IC 328 and configured to face the second magnet 310. In some implementations, the position sensor is a Hall-effect sensor that detects changes in magnetic fields in proximity of the sensor. Because of the positioning of the second magnet 310 relative to the Hall-effect sensor (position sensor), the sensor detects when the carrier module 304 and second magnet 310 move toward or away from the sensor (and thus the position of the carrier module 304) based on the strength of the magnetic field produced by the second magnet 310 at the Hall-effect sensor.

Figure 3E:
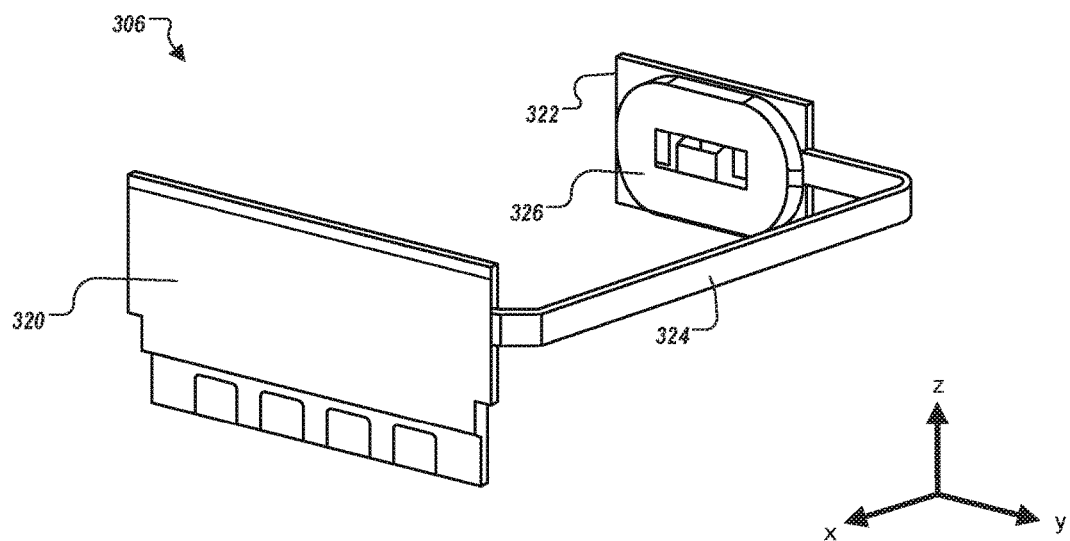
FIGS. 3E-3F are perspective views of a connector assembly of the actuator.
Figure 3F:
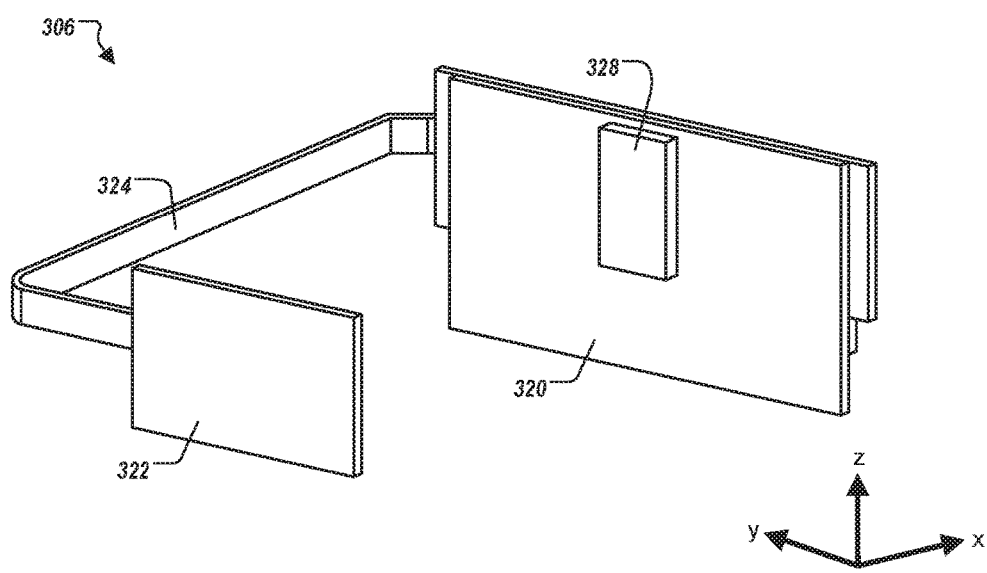

FIGS. 3E and 3F show close-up perspective views of the connector assembly 306. The connector assembly 306 includes a pair of substrates 320, 322 connected by a connector component 324. The substrates 320, 322 can be made from a flexible printed circuit board. The connector component 324 can be made from a rigid-flex type printed circuit board. The connector component provides physical separation between the wire coil 326, which is mounted on the first substrate 322, and the driver IC 328, which is mounted on the second substrate 320. A position sensor can optionally be mounted on the second substrate 320, as well.

Figure 3G:
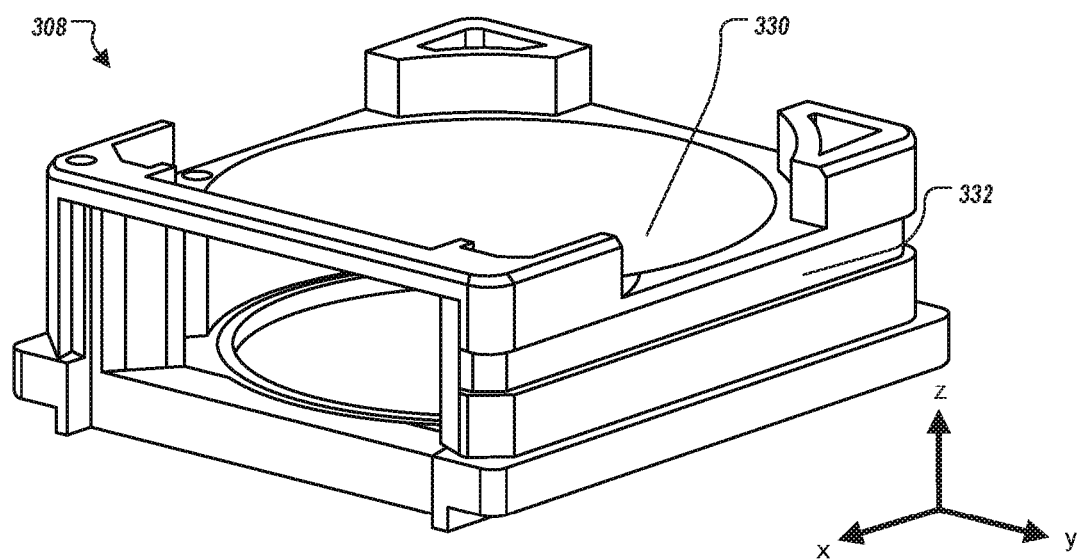
FIGS. 3G-3H are perspective views of an example housing of the actuator.
Figure 3H:
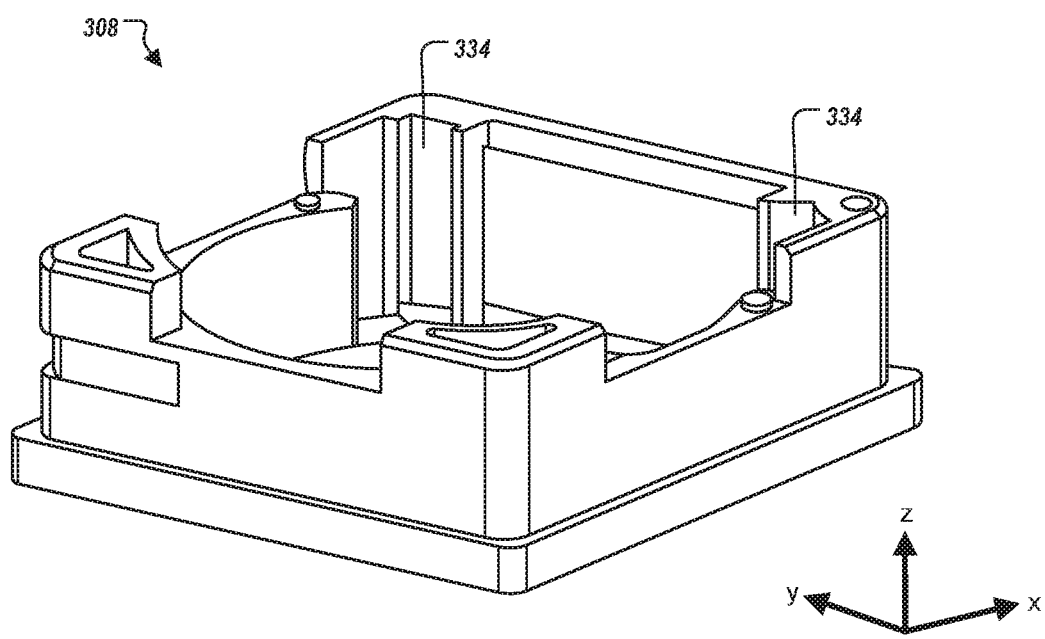

FIGS. 3G and 3H show close-up perspective views of the housing 308 of the actuator 300. As has been described, the housing 308 is configured to support the carrier module 304 and to permit the carrier module 304 to slide vertically (along the z-axis in FIGS. 3G-3H) within limits in a central opening 330 of the housing 308. The housing 308 further includes a horizontal channel 332 on an exterior surface that is adapted to receive the connector component 324 of connector assembly 306 in use. A pair of vertical channels 334 on the second lateral side of the housing are configured to receive the stacks of balls 312 on the carrier module 304, to reduce friction as the carrier module 304 slides within housing 308.

Figure 4:
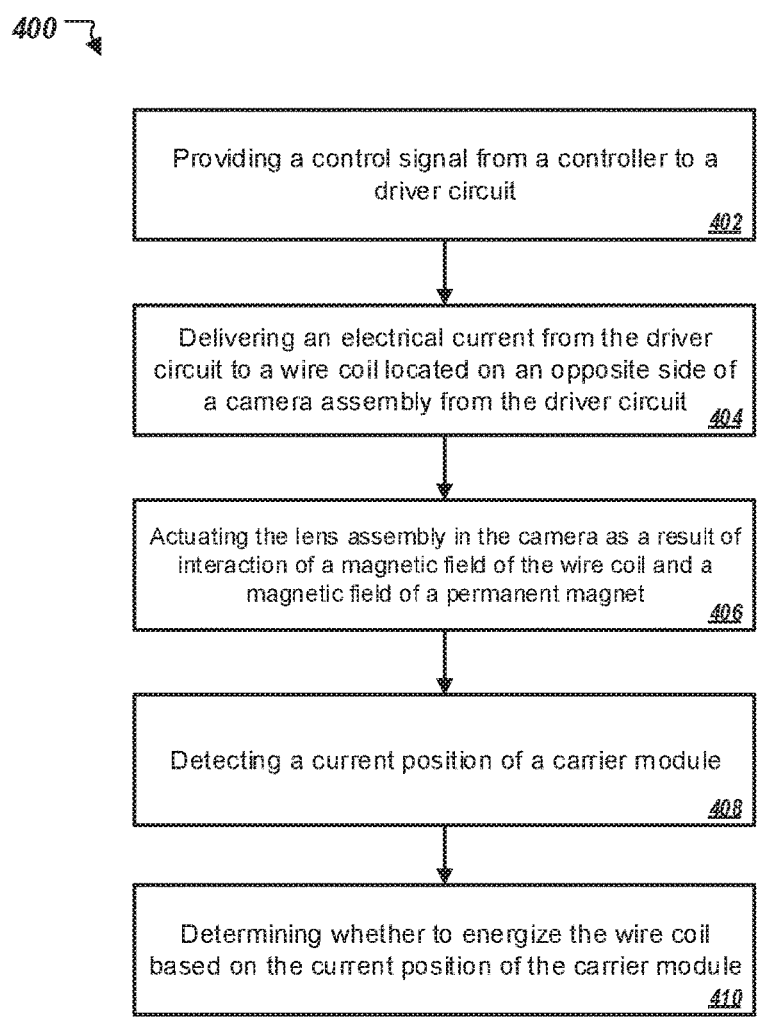
FIG. 4 is a flowchart of an example process for actuating a lens assembly in a camera module with a voice coil motor.

Referring to FIG. 4, a flowchart is shown of an example process 400 for actuating a lens assembly in a camera. In some implementations, the process 400 can be performed using the camera module 100 (described with respect to FIG. 1) and the actuator 300 (described with respect to FIGS. 3A-3H).

At stage 402, a controller outputs a control signal for receipt by the driver IC 328. The control signal can indicate one or more parameters for adjusting a position of the carrier module 304 (and lens assembly) within the housing 308 of the actuator 300. For example, the control signal can indicate an instruction to move the carrier module 304 higher within the housing 308 and thus further away from the image sensor, or can indicate an instruction to move the carrier module 304 lower within the housing 308 and thus closer to the image sensor at the base of the housing 308.

At stage 404, the driver IC 328 receives the control signal and, in response, generates an electrical signal at an output pin of the driver IC 328, the electrical signal having sufficient power to energize the wire coil 326 and generate a magnetic field whose interaction with the magnetic field of first permanent magnet 318 drives the carrier module 304 up or down in the housing 308. The electrical signal output by the driver IC 328 is delivered to the wire coil 326 via electrical traces that extend along connector component 324 from the first lateral side of the actuator 300 to the second lateral side of the actuator 300.

At stage 306, the lens assembly is actuated (e.g., moves up or down with carrier module 304 in the housing 308) based on the interaction of the magnetic fields between energized wire coil 326 and first permanent magnet 318.

In some implementations, the system includes a position sensor to provide closed-loop feedback for improved control in positioning the carrier module 304 and lens assembly within the housing 308. In these implementations, at stage 408, the system can use the position sensor to detect a current position of the carrier module 304 within the housing 308. An output signal from the position sensor can be processed by the external controller to determine the current position of the carrier module 304 or the lens assembly. The controller can then compare the current position to a target position of the carrier module 304 or the lens assembly. Based on any difference between the current and target positions, at stage 410, the controller can generate an updated control signal that is transmitted to the driver circuit. The process 400 can repeat to drive the carrier module 304 and the lens assembly to the target position determined by the controller.

Figure 5:
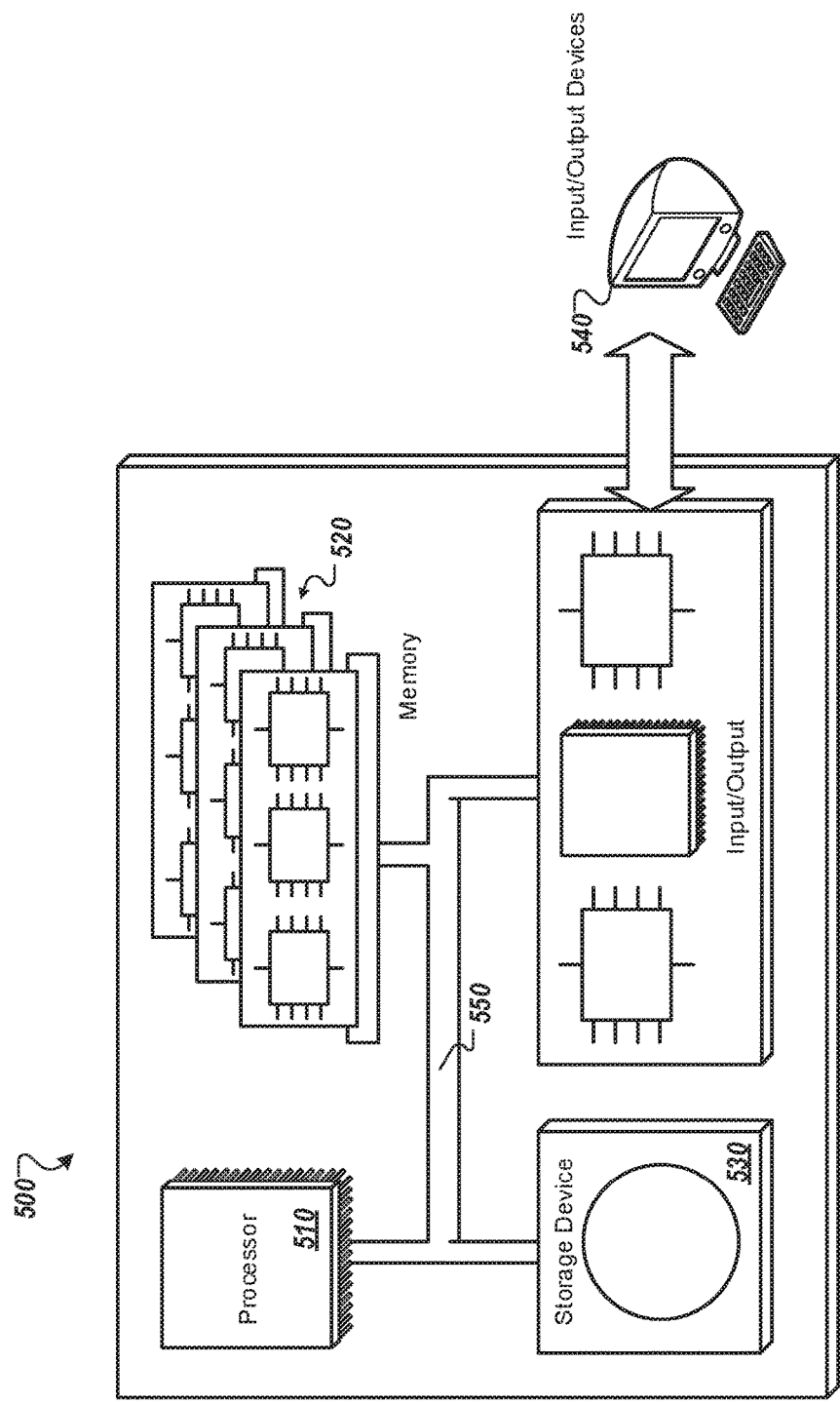
FIG. 5 depicts a block diagram of an example computing or electronic device in which the computer-implemented techniques described herein can be implemented.

FIG. 5 is a schematic diagram of a computing device 500. The device 500 can be used to carry out the operations described in association with any of the computer-implemented methods described previously, according to an example implementation. The device 500 is intended to include various forms of digital computers, such as laptops, desktops, workstations, personal digital assistants, servers, blade servers, mainframes, and other appropriate computers. The device 500 can also include mobile devices, such as personal digital assistants, cellular telephones, smartphones, and other similar computing devices. Additionally the system can include portable storage media, such as, Universal Serial Bus (USB) flash drives. For example, the USB flash drives can store operating systems and other applications. The USB flash drives can include input/output components, such as a wireless transmitter or USB connector that can be inserted into a USB port of another computing device.

The device 500 includes a processor 510, a memory 520, a storage device 530, and an input/output device 540. Each of the components 510, 520, 530, and 540 are interconnected using a system bus 550. The processor 510 is capable of processing instructions for execution within the device 500. The processor can be designed using any of a number of architectures. For example, the processor 510 can be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the device 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can be a floppy disk device, a hard disk device, an optical disk device, or a tape device.

The input/output device 540 provides input/output operations for the system 400. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what can be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. An actuator for adjusting focus in a camera, the actuator comprising:
   a housing;
   a carrier module slidably received within a central opening of the housing, the carrier module configured to carry a lens assembly of the camera;
   a magnet located on a first lateral side of the carrier module;
   a wire coil located on or along a first lateral side of the housing and adjacent to the magnet on the first lateral side of the carrier module;
   a driver integrated circuit mounted on a printed circuit board that is located on or along a second lateral side of the housing, the second lateral side of the housing positioned opposite the first lateral side of the housing; and
   a connector component that extends from a first region that is proximate to the first lateral side of the housing to a second region that is proximate to the second lateral side of the housing, the connector component including at least one conductor configured to deliver an electrical current from the driver integrated circuit to the wire coil to energize the wire coil.

2. The actuator of claim 1, wherein:
   the magnet located on the first lateral side of the carrier module is configured to generate a first magnetic field;
   the wire coil, when energized, is configured to generate a second magnetic field; and
   the carrier is configured to slide within the central opening of the housing to a position that results from interaction of the first magnetic field generated by the magnet and the second magnetic field generated by the energized wire coil.

3. The actuator of claim 1, wherein the magnet located on the first lateral side of the carrier module comprises a permanent magnet.

4. The actuator of claim 1, wherein the connector component comprises a rigid-flex printed circuit board, and the at least one conductor of the connector component comprises at least one conductive trace disposed on or within the rigid-flex printed circuit board.

5. The actuator of claim 1, wherein the driver integrated circuit is configured to receive, from a controller, a control signal that indicates an activation state to apply to the wire coil, and the driver integrated circuit is configured to deliver the electrical current to the wire coil to energize the wire coil according to the activation state indicated by the control signal.

6. The actuator of claim 1, wherein the actuator is configured to embed in a computing device or in an electronic display assembly in an orientation in which the first and second lateral sides of the housing run vertically along respective axes that extend between a top of the computing device or electronic display assembly and a bottom of the computing device or electronic display assembly.

7. The actuator of claim 1, further comprising a position sensor located on or along the second lateral side of the housing, the position sensor configured to sense a current position of the carrier module from a range of possible positions that the carrier module is capable of sliding to within the central opening of the housing.

8. The actuator of claim 7, wherein the position sensor comprises a hall-effect sensor located on or along the second lateral side of the housing, and
   the actuator further comprises a second magnet located on a second lateral side of the carrier module opposite the first lateral side of the carrier module, the second magnet being adjacent to the hall-effect sensor to permit the hall-effect sensor to sense motion of the second magnet that results when the carrier module slides within the central opening of the housing.

9. The actuator of claim 1, further comprising one or more stacks of roller balls arranged to facilitate a linear sliding motion of the carrier module within the central opening of the housing.

10. The actuator of claim 1, wherein the wire coil is mounted on a first printed circuit board that is located along the first lateral side of the housing.

11. A camera, comprising:
   an actuator, comprising
      a housing;
      a carrier module slidably received within a central opening of the housing, the carrier module configured to carry a lens assembly of the camera;
      a magnet located on a first lateral side of the carrier module;
      a wire coil located on or along a first lateral side of the housing and adjacent to the magnet on the first lateral side of the carrier module;
      a driver integrated circuit mounted on a printed circuit board that is located on or along a second lateral side of the housing, the second lateral side of the housing positioned opposite the first lateral side of the housing; and
      a connector component that extends from a first region that is proximate to the first lateral side of the housing to a second region that is proximate to the second lateral side of the housing, the connector component including at least one conductor configured to deliver an electrical current from the driver integrated circuit to the wire coil to energize the wire coil;
   the lens assembly, wherein the lens assembly is secured at least partially within the carrier module of the actuator;
   an image sensor located at a fixed position relative to the housing of the actuator, wherein one or more lenses of the lens assembly are configured to direct external light through an aperture and to a surface of the image sensor;
   wherein the camera is configured to adjust focus by moving the carrier module and the lens assembly along an optical axis that extends through the one or more lenses and the image sensor when the electrical current delivered from the driver integrated circuit to the wire coil is adjusted.

12. A computing device, comprising:
   an electronic display;
   a camera, comprising;
      an actuator, comprising
         a housing;
         a carrier module slidably received within a central opening of the housing, the carrier module configured to carry a lens assembly of the camera;
         a magnet located on a first lateral side of the carrier module;
         a wire coil located on or along a first lateral side of the housing and adjacent to the magnet on the first lateral side of the carrier module;
         a driver integrated circuit mounted on a printed circuit board that is located on or along a second lateral side of the housing, the second lateral side of the housing positioned opposite the first lateral side of the housing; and a connector component that extends from a first region that is proximate to the first lateral side of the housing to a second region that is proximate to the second lateral side of the housing, the connector component including at least one conductor configured to deliver an electrical current from the driver integrated circuit to the wire coil to energize the wire coil;

the lens assembly, wherein the lens assembly is secured at least partially within the carrier module of the actuator;

an image sensor located at a fixed position relative to the housing of the actuator, wherein one or more lenses of the lens assembly are configured to direct external light through an aperture and to a surface of the image sensor;

wherein the camera is configured to adjust focus by moving the carrier module and the lens assembly along an optical axis that extends through the one or more lenses and the image sensor when the electrical current delivered from the driver integrated circuit to the wire coil is adjusted;

one or more processors; and one or more non-transitory computer-readable media having instructions stored thereon that, when executed by the one or more processors, are configured to provide a camera application that uses the camera to capture digital images of scenes in an environment of the camera and to provide the images for display on the electronic display.

13. The computing device of claim 12, wherein the computing device is a smartphone, a tablet computing device, or a notebook computer.

14. The computing device of claim 13, wherein the computing device is a smartphone that includes the electronic display on a front side of the smartphone, wherein the camera is embedded in the smartphone as a front-facing camera on the front side of the smartphone.

15. A method for actuating a lens assembly in a camera, the method comprising:

receiving, by a driver integrated circuit and from a controller, a control signal that causes the driver integrated circuit to energize a voice coil motor of the camera, the voice coil motor including a permanent magnet and an electromagnet having a wire coil, the permanent magnet located on a first lateral side of a carrier module that holds the lens assembly, the wire coil located on or along a first lateral side of a housing that slidably receives the carrier module, the first lateral side of the carrier module located adjacent to the first lateral side of the housing such that the permanent magnet and the wire coil are located adjacent to each other, the driver integrated circuit electrically coupled to the wire coil and mounted on a printed circuit board that is located on or along a second lateral side of the housing, the second lateral side of the housing positioned opposite the first lateral side of the housing;

in response to receiving the first signal that is to cause the driver integrated circuit to energize the voice coil motor of the camera, delivering an electrical current from the driver integrated circuit to the wire coil to generate a first magnetic field around the wire coil that interacts with a second magnetic field of the permanent magnet; and as a result of delivering the electrical current from the driver integrated circuit and through the wire coil to generate the first magnetic field that interacts with the second magnetic field of the permanent magnet, actuating the lens assembly in the camera including sliding the carrier module within the housing by a positive distance along an optical axis of the camera.

16. The method of claim 15, further comprising:

detecting a current position of the carrier module within the housing using a position sensor located on or along a lateral side of the housing; and determining whether to energize the voice coil motor of the camera based on the current position of the carrier module within the housing and a focus objective for the camera.

17. The method of claim 15, wherein the camera is embedded in a smartphone, a tablet computing device, or a display assembly of a notebook computer.

18. The method of claim 15, wherein actuating the lens assembly by sliding the carrier module within the housing by the positive distance along the optical axis of the camera causes motion of one or more lenses of the lens assembly toward or away from an image sensor of the camera to adjust the focus of the camera.

* * * * *